United States Patent [19]

Dunn

[11] 3,947,973

[45] Apr. 6, 1976

[54] NAVIGATION TEACHING AID

[76] Inventor: Gerald Raymond Dunn, Great Downs, Tollesbury, Near Maldon, Essex, England

[22] Filed: Dec. 12, 1973

[21] Appl. No.: 424,012

[30] Foreign Application Priority Data
Dec. 12, 1972 United Kingdom............... 57295/72

[52] U.S. Cl................................. 35/10.2; 33/270
[51] Int. Cl.[2]........................................ G01C 21/00
[58] Field of Search ............... 35/10.2; 33/270, 274

[56] References Cited
UNITED STATES PATENTS

| | | | |
|---|---|---|---|
| 13,560 | 9/1855 | Abbott | 33/270 |
| 100,691 | 3/1870 | Trueg | 33/270 |
| 2,207,195 | 7/1940 | Guadet | 33/270 |
| 2,440,827 | 5/1948 | Marean, Jr. et al. | 33/270 |
| 2,441,636 | 5/1948 | Kaufman et al. | 33/270 |
| 2,914,853 | 12/1959 | Michell | 35/10.2 |

Primary Examiner—Malcolm A. Morrison
Assistant Examiner—Errol A. Krass
Attorney, Agent, or Firm—Pollock, VandeSande & Priddy

[57] ABSTRACT

The invention relates to a navigational instrument which can be used as an elementary navigation teaching aid. It can also be used for finding Local Time by apparent sun or by mean sun; finding Greenwich Mean Time (or any other standard zone time) if the longitude is known; finding longitude if Greenwich Mean Time is known; finding latitude; finding the sun's altitude, zenith distance, amplitude and declination; finding the date, finding observer's geographical position by fix; and finding observer's position by land marks. The instrument comprises a base member having a datum such as a meridian line and being capable of being set in a predetermined position, means of measuring the angle between a line of sight from an object and the datum, means of finding local time by the apparent sun which means is rotatably mounted on a pivot on the base member, and a source of reference from which the ephemeris of the sun proper to any day of any year can be obtained. The instrument has the advantage of being robust and simple.

7 Claims, 7 Drawing Figures

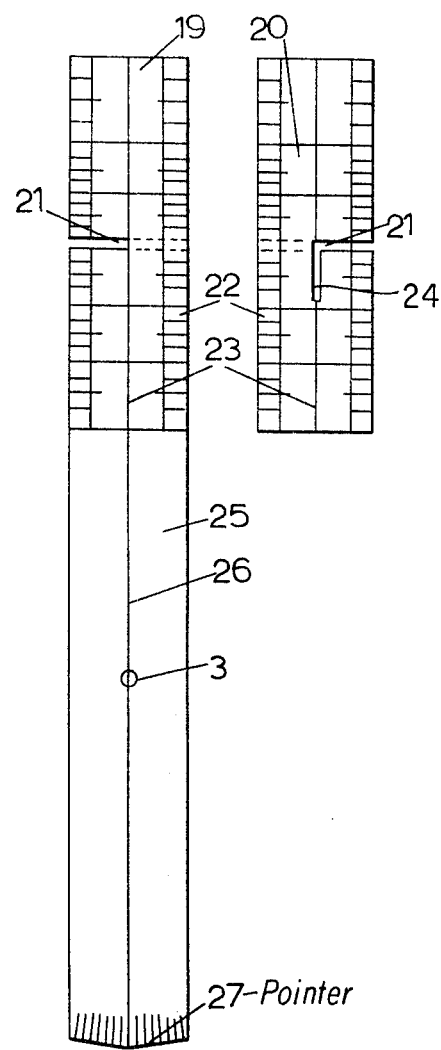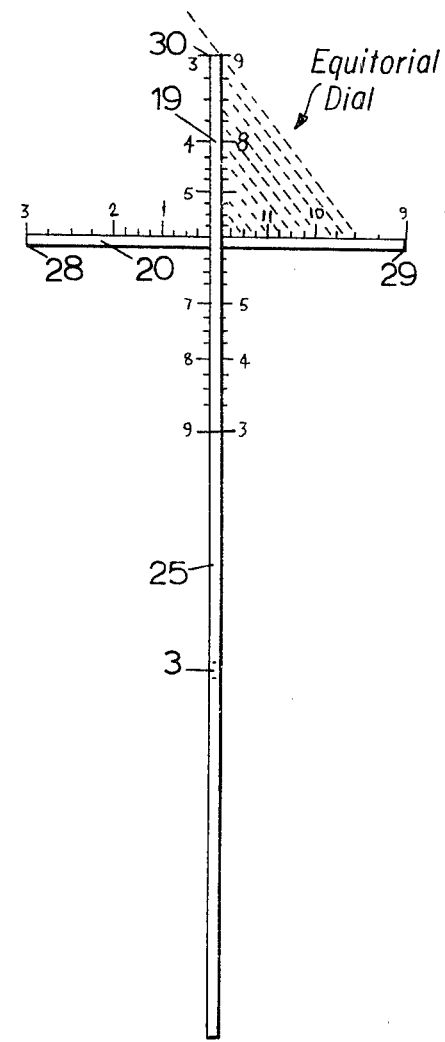

NAVIGATION TEACHING AID

This invention relates to a solar navigational instrument which can be used as an aid in the teaching of elementary navigation in schools or for finding local Time by apparent sun or by mean sun; finding Greenwich Mean Time (or any other standard zone time) if the longitude is known, finding longitude if Greenwich Mean Time is known; finding latitude; finding the sun's altitude, zenith distance, amplitude and declination; finding the month and date, finding observer's geographical position by fix; and finding observer's position by land marks.

BACKGROUND OF THE INVENTION

The above data is usually obtained by means of the Marine Sextant or Theodolite with the help of almanacks and nautical tables.

The sextant is expensive and fragile and when teaching it is seldom feasible to provide each member of a class with his own instrument and set of reference volumes. The sextant requires a clear horizon. Consequently it cannot be used in most inland situations unless an artificial horizon is employed which is difficult to provide.

The required reference volumes are costly, bulky and require annual replacement. Use of the sextant and its attendant books demands of the student a relatively advanced knowledge of mathematics, and even when up-to-date tables are used there is much room for error and doubt. Furthermore very few students ever understand these tables, merely learning how to use them by rote.

An object of this invention therefore is to provide a robust and simple device for obtaining the above data which is at a price within reach of school budgets, which will provide the above information in an understandable manner and with sufficient accuracy to yield a navigational 'fix' to the nearest whole degree of Longitude and Latitude in the absence of a sensible horizon; and which will yield a pilotage fix accurate enough for rough and ready coastal navigation when land marks are in sight.

THE INVENTION

Use of the invention does not require the aid of any tables or almanacks. It is universal in that it can be used anywhere from the North Pole to the South Pole and can be used year after year. It may be understood and used by any novice above the average mental age of about twelve years after only a few minutes instruction. It posesses its own integral source of reference for ephemeris of the sun proper to any day of any year. It gives the end result of any observation directly unlike the sextant which gives no more than certain angular values which then have to be subjected to complicated mathematical manipulation. The instrument thus gives the result in a form which requires no further calculation on the part of the observer other than the addition or substraction of a few minutes from a clock reading.

The device of the invention can be used as a universal aid in the teaching of elementary Solar Navigation and coastal pilotage. However, it may also be used in a practical role on land, sea or air by surveyors, mariners, and other travellers for rapid position finding by solar observation whenever extreme accuracy is not of paramount importance. The device of the invention comprises a means of setting a meridian line horizontally, a means of finding Local Time by the apparent sun, which means is rotatably attached to a point on the meridian line by a pivot, a means of measuring any angle formed at the pivot between the meridian line and a line of sight from the sun or from any other observed object and between the meridian line and any other line upon a part of the device, a means of visual indication by which the aforesaid angle values may be directly read off against scales, and a source of reference from which the sun's ephemeris proper to any day of any year can be extracted by inspection.

PREFERRED EMBODIMENTS OF THE INVENTION

Essentially the device of the invention consists of five components. These are: a pivot on which other parts of the device are able to rotate, a base, a protractor, a pointer arm, and an equatorial dial. These components are now described as follows:

THE PIVOT

This can be a simple threaded bolt or spindle with a washer and nut. The nut can be knurled for hand tightening and slackening. The functions of the pivot are two-fold: firstly it has to hold the parts of the device together, and secondly it has to permit the moving parts of the assembly to rotate independently of one another and to be set or clamped by the nut in any angular position relative to one another.

However, instead of this simple threaded bolt the pivot can consist of any other suitable pin, axle, spindle bush or bearing which effectively confers on the parts the two principal functions of the pivot specified in the preferred version. The pivot could be a composite knit of concentric bushes, as commonly found at the centre of a clock face, enabling the hands to rotate about the centre at different rates. Alternatively the pivot could be formed with a control knob, either turning the parts directly, or geared to provide fine adjustment.

THE BASE

This can be a flat and reasonably rigid board or plate with a meridian line drawn horizontally upon its surface. On the meridian line there is a pivotal point. It is through this pivotal point that the Pivot is inserted. Another line named the equinoctial line intersects the meridian line normal thereto; the point of intersection corresponding with the pivotal point.

With the pivotal point as centre, and a radius of convenient length, an arc is struck through the equinoctial line, extending to both sides of the equinoctial line by a distance which will subtend at the pivotal point an angle not less than 23½°; i.e. the maximum angle of declination reached by the sun at solstices. The name of this arc is the declination arc and it is graduated in degrees.

There are two scales, both of which commence from zero on the equinoctial line. The scale to the left represents South declinations of the sun. The scale to the right is for North declinations.

The equinoctial line derives its name from the fact that it is only at the Vernal and Autumnal equinoxes that the declination of the sun is nil; and that at Salstices the sun's declination amounts to 23½ degrees North in summer and 23½° South in winter (vice versa according to hemisphere).

The meridian line need not necessarily be a physical line on the card. It could be the edge of the card itself or a notional line or direction established by slinging the card in gimbals or by levelling the card with a bubble tube; or by means of a pendulum or plumb line, or by any other means at all designed for holding or sighting the meridian line horizontally.

The declination arc will normally be graduated in degree notation, but instead, or in addition it may have a calendrical scale and/or a Zodiac scale. That is to say the offset from the equinoctial line may be measured in months and days instead of or in addition to, degrees. For example, if the offset was scaled in dates, this would eliminate one step in the finding latitude as the instrument could be set to the appropriate date to allow for the declination for that particular day.

THE PROTRACTOR OF SORTS

This also is a flat and rigid board or plate. Its rational centre is named the Pivotal Point and it is through this point that the pivot inserts to join the protractor to the card, but leaving the protractor free to rotate in the plane of the card.

The protractor is of semicircular shape (slightly entended for mechanical reason only); whose radius is the same as that predicated for the Declination arc. The Diameter line of the protractor is named the Axis Line. Arising at the pivot point, and perpendicular to the Axis line is another named the Equator Line.

Commencing with zero on the equator line, the circumference of the protractor is graduated with two scales of degrees. The left hand scale represents North latitudes and amounts to 90° at the point where the axis line cuts the circumference. Thus the 90° mark on this scale stands for the Northern pole of the Earth. The right hand scale represents South latitudes, with the Southern pole of the Earth on that side.

By the same analogy the two poles are conjoined by the axis line representing the Earth's axis of rotation. It must follow that, if this half-sectional model of the Earth is properly oriented with the axis of the real world, and with the meridian plane, any ray of light from the sun will fall upon the model world in exactly the same way as it would upon the terrestrial sphere.

Theoretically the protractor, i.e. the means of measuring angles, does not have to be a separate component. A simple scale of chords drawn anywhere upon a part of the assembly would, with the aid of dividers, enable any required angle to be set up, or guaged, between the meridian line and other lines. Alternatively the means could be a semicircular figure drawn directly upon the surface of the base and suitably graduated. Such arrangement would serve the purpose of measuring angles, but some of the operations of which this instrument is capable in its preferred form would have to be forfeited.

Nor, when the protractor is a separate component, does it have to be semicircular in shape. It could be a full circular disc. Or, if such an instrument were to be made for use in only one hemisphere, this component could then be made of quadrantal shape. Also, the graduation of the circumference of the protractor could differ from the form preferred without altering its purpose; e.g. scales could be reversed so that instead of indicating the Complement of the angle contained between the meridian line and the dial plane line, the pointer would indicate the actual angle so contained. Also the protractor could be provided with independent means of clamping it in any position relative to the base to prevent shift; and moreover, if high cost was not objectionable, the rim of the protractor could be provided with some kind of ratchet or screw gear, with or without micrometer, for accurate adjustment.

THE POINTER ARM

This can be an elongated strip of board with a pivotal point at or near its middle, through which the pivot is inserted. Through the pivotal point a continuous straight line is drawn along the whole length of the pointer arm. This line is named the dial plane line. The pointer arm, when mounted on the pivot, is free to rotate in the plane of the card. Thus, in relation to the meridian line, whatever angle is contained between the dial plane line and the axis line on one side of the pivot, is diametrically repeated on the other side by the rule of opposite angles.

The length of the pointer arm is approximately equal to the diameter of the protractor since the function of the pointer arm is to point to the scales on the circumference of the protractor.

Clearly when the pointer arm is rotated about the pivot, one of its extremities will sweep the circumference of the protractor and indicate in what angular relativity the dial plane line stands to the axis line at any setting. One extremity of the pointer arm is provided with a small vernier scale. The other extremity of the pointer arm now serves as a mounting to which the dial is attached, and by means of which the dial may be moved around the pivot with the pointer arm, the plane of the dial being in correspondence with the dial plane line upon the pointer arm.

Instead of being in the form of a strip of board, the pointer arm may be a rod, bar or beam, for example. The dial plane line may then be the notional longitudinal axis of such member. The extremity of the pointer arm can, instead of terminating in a vernier scale, be fashioned into an arrow headed form like the hand of a clock. Alternatively it could have a small window in its end through which the angle could be read.

When it has a vernier scale there is nothing, apart from cost, to prevent incorporation of a screw guage on the vernier for very fine adjustment provided the pointer is capable of sweeping the scales of the protractor to indicate angles.

In the preferred form the dial plane line, and consequently the pointer arm, are linear extensions of the dial plane but this is not essential. The pointer arm can be canted or cranked to the plane of the dial so long as the various scales are modified to achieve the prime object of the pointer arm.

While the pointer arm as a separate unit is highly desirable, an instrument of much the same cognate nature can be constructed which does not possess a pointer arm at all. The dial could then be attached directly to the edge of the protractor's circumference and with suitable alteration to the scales it could be made to function after a fashion; though it would entail considerable calculation by the operator.

THE EQUITORIAL DIAL

The cruciform type of equatorial dial is preferred for reasons of simplicity and economy. The essential characteristics and modes of use of the dial on a Cross are already fully documented in the art or dialling science and require no detailed description here, except to nominate the parts for easier reference hereinafter.

The cross dial consists of two structural members set up normal to each other to form a simple cross with four exactly equal arms. The first member may be termed the Central Member and its extremities are called (a) the foot of the cross, and (b) the head gnomon. The second member is named the transverse member whose extremities are called (a) the east gnomon and (b) the west gnomon, signifying the geographical directions in which they are required to point when the dial is properly oriented.

The various surfaces of the arms of the cross are graduated with scales of hours and parts. As the sun moves round the firmament in the course of a day it casts, from one or other of the gnomons, a shadow which falls upon the hour scales so indicating directly time by the apparent sun at the place of observation.

By the term dial plane is meant the theoretical mid section of the cross as viewed in plan, and it is this notional plane which must correspond with the dial plane line on the pointer arm.

The two structural members of the cross, for reasons of convenience, are preferably, half-jointed together so that they can be taken apart for storage. The transverse member has a narrow slit aperture cut through it along the line of the dial plane, permitting a beam of sun light to pass whose purpose will be explained later.

The dial and pointer arm have so far been discussed as though they were two discrete components. It is, however, preferred for reasons of simplicity and economy to make the pointer arm and the central dial member out of one continuous strip of material. In effect then, the pointer arm is an extension of the foot of the cross, and the dial plane is an extension of the dial plane line.

The chosen dial need not, however, be cruciform in configuration. It could take any one or more of the several traditional forms of this generic group of equatorials so long as it conforms to the well known rules governing their design. The common characteristic of all equatorials is that the plane of the dial must be capable of being elevated until it lies in the plane of the celestial equator, whilst at the same time being oriented with the georgraphical meridian of the place of use. Alternative forms of equatorial dials could be circular, segmental, hemispherical or any other shape with or without slip-rings, arms or other attachments designed to compensate for mean time, apparent time or Zone time differentials. Any such equatorial dial could serve the purpose of the invention without in any way altering its cognate nature. The sole reason for preferring the cross dial is that it is very simple to use and cheap to manufacture.

While it has been preferred to make the central member of the cross intergral with the pointer arm, this need not always be the case. The dial could be made as a separate unit rivited, bolted or otherwise secured onto the end of the pointer arm, permanently or detachably. In fact dials of different kinds could be supplied with the basic instrument so that they could be changed for one another.

An alternative to the slit aperture in the transverse member of the cross, or an other dial, might be to have a small peep-hole in the transverse member (or in some upstanding part of alternative dials) coupled with a small target upstanding from the dial plane line in order to receive the beam of light.

THE MEANS OF REFERENCE

This element is to allow nautical tables and almanacks to be dispensed with.

The means of reference consists of two curves superimposed one upon the other across a grid of co-ordinates. One of these curves, namely the declination curve, plots the variation of the sun's declination over the year. The other curve, namely the apparent sun curve, plots the equation of time as it varies over the year, i.e. the difference between apparent solar time and mean solar time. Both curves traverse a grid whose horizontal axis is a scale of months of the year and whose vertical axis is a scale of quantity. The mid horizontal line of this grid is treated sometimes as representing mean time, and sometimes as zero declination, depending upon which curve is being studied. When following the declination curve the quantity scale is read in degrees of arc. When following the apparent sun curve the same quantities are interpreted as minutes of time. When the declination curve is above the mid-line declination is North and when below it is South.

Similarly, when the apparent sun curve is above the mid-line, the apparent sun is running in advance of the mean sun, and the interval so found must be subtracted from the dial's reading. When the curve is below the mid-line the apparent sun is in arrear of mean sun, and the appropriate interval must be added to the dial's reading. Thus, on any day, the sun's ephemeris proper to that day can be rapidly obtained by inspection and applied to readings made with the instrument.

The curve of declination may be plotted from any almanack, taking each daily plot as the average for that day over a four year period. This can be done arithmetically, but in practice it is sufficient to plot the curve directly from the second year's almanack after any leap year. Similarly the apparent sun curve is plotted from the 'Equation of Time' in the same almanack, and the potential error which is inherent in this means of reference is kept within the limits predicated for the instrument. This is a principal reason why the instrument cannot be claimed to yield a navigational fix to an accuracy greater than to the nearest whole degree of geographical bearings.

Finally, the means of reference includes a conversion scale to assist in rapid conversion of arc notation into time notation (and vice versa). This consists of an arc of 90° drawn upon any vacant surface of the components, with a scale of time upon one side of the arc and a scale of degrees upon the other in the ratio of 1 hour to 15°. Thus any value in one notation system can be directly read off on the other. Values greater than 90° (or 6 hours) can be built up from multiples and parts of the scale provided.

The means of reference as preferred are simply inscribed upon any suitable vacant area of the base or the protractor.

Alternative to the arrangement preferred this could take many other forms. It could be tabular, formulative or diagrammatic. It could be a separate booklet; or it could be a further component attached, or hinged to some other part of the front or back of any component; or it could be a concealed 'pull-out' for reference when required.

It can be seen from the above that if the head gnomon of the cross is directed towards the sun a beam of light passing through the slit will illuminate the surface of the pointer arm. Now, if the head gnomon is raised or lowered until this beam of light corresponds with the dial plane line, this will signify that the dial plane line, at that moment, is the exact occulation with the centre of the sun's disc. And if, at the same moment, the meridian line is in a horizontal attitude (and the axis line also) then the pointer will indicate on the scale of the protractor the complement of the sun's altitude above the rational horizon, i.e. the sun's zenith distance. Further, if the protractor is now swung, without disturbing the pointer arm, until the equator line corresponds with the correct declination for the day (upon the declination arc), then the pointer arm will be found pointing automatically to the latitude of the place. Therefore, it 'speaks' the latitude directly.

Also if the axis line is brought into correspondence with the meridian line, and if the meridian line is horizontal in alignment with the geographical meridian of the place, and the dial is elevated until the pointer points to the latitude of the place then:

a. The dial plane line will point to the celestial equator.
b. The meridian line will point to the rational horizon.
c. The East and West gnomons will point East and West respectively.

The Instrument is therefore oriented for that place and rectified for use as a sun clock which will directly show by shadow the Local Time by apparent sun. Thus coupled with a knowledge of G.M.T. (from chronometer, radio, telephone) it is possible to find both longitude and latitude. Hence the geographical position of the observer can be found from the sun.

Though it is preferred to assemble the parts in the order given above, i.e. first the base, then the protractor and then the pointer arm this does not preclude assembly of the parts in any other order. For example there is no reason why the pointer arm should not be placed between the base and the protractor.

The pivot could be lengthened to accomodate a plumb line, or pendulum, or any other kind of zenith seeking means to assist in levelling the meridian line, but generally this would be considered to be unnecessarily complicated in an instrument where absolute simplicity is of paramount importance. It is not however excluded.

It is also possible to have mounted on the pivot, one or more 'set pointers' of the kind commonly seen on the face of aneroid barometers to mark some datum against which subsequent readings could be compared to reveal changes or movement over an interval of time or place. For example, a dummy pointer could be centred on the pivot to indicate a particular day's declination and locked there as a means of showing how the declination varies on the following day, or after any other interval.

Although an aim of the invention is to provide an instrument which can be carried in a jacket pocket the larger the instrument is the more accurately it can be read. Therefore dimensions are entirely arbitrary. It could be advantageous for scholastic purposes to provide say a pack of 10 small instruments with a larger one for use by the instructor.

The invention will now be illustrated by way of example with reference to the accompanying drawings in which:

FIG. 3 shows the cross dial dismembered with one of its arms extended to form the pointer arm;

FIG. 4 shows the cross dial in plan assembled;

Figure 1:
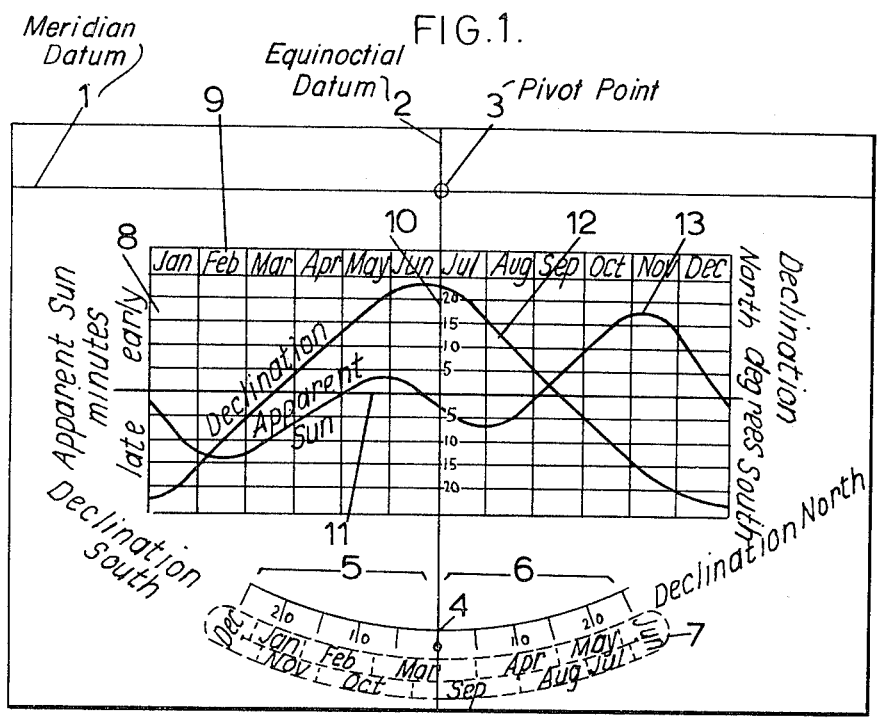
FIG. 1 shows the base of a device of the invention in elevation.

The base shown in FIG. 1 has a meridian line 1 intersected by an equinoctial line 2 at a pivot point 3.

The equinoctial line 2 is cut by a declination arc 4 extending to either side of the equinoctial line 2 and graduated in degrees with zero on the equinoctial line 2, south declinations 5 extending to the left and North declinations 6 extending to the right. An alternative method of calibration of this arc 4 by dates is suggested in broken line 7 alongside the declination arc 4. This date scale 7 could be replaced by a Zodiac Scale (not shown) arranged in a similar manner.

A grid 8 with a scale of months 9 as one of its axes, and a scale of quantity 10 as the other, and a mean line 11, is traversed by a curve of declination 12 and also by a curve representing the error of the apparent sun 13. The mean line 11 represents mean time when following the apparent sun curve 13, but when following the declination curve 12 it represents zero declination. The apparent sun is in advance of the mean sun when the curve 13 is situated above the mean line 11, but when it is below the mean line 11 the apparent sun is in arrear or the mean sun in either case by the number of minutes indicated by the quantity scale 10. Likewise, when reading the curve of declination 12 intervals above the mean line 11 show that the sun is declining North of the Celestial equator; below, South; in both cases by the number of degrees shown by the quantity Scale 10.

Figure 2:
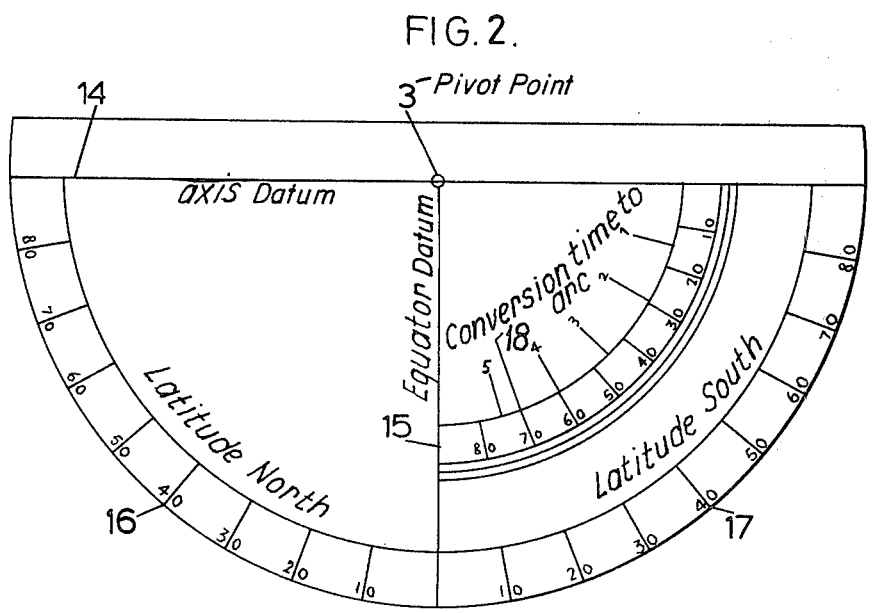
FIG. 2 shows the protractor of the device in elevation.

The protractor for measuring angles shown in FIG. 2 has a pivot point 3 an axis line 14 intersecting an equator line 15 which divides the semicircle into two quadrants, the left hand quadrant representing the Northern hemisphere with a latitude scale 16 showing Northern Latitudes and the right hand quadrant sealed with Sourth Latitudes 17. The two latitude scales 16 and 17 both commence from zero on the equator line 15 and rise to 90° at each end of the axis line 14.

Situated within one of these quadrants, is an arc intercepting 90°, being the Conversion Scale 18 enabling time and arc notations to be directly compared.

The cross dial shown in FIGS. 3 and 4 is for finding apparent time.

One arm of the cross is extended to form the pointer arm. The cross is shown dismembered and consists of a Central Member 19 and a transverse member 20 both members having a slot 21 in their edges so that when assembled with these slots interengaged they form together a Cross of four exactly equal arcs. The central member 19 is calibrated on both its front and back surfaces with a scale of hours and quarters 22, but the transverse member 20 is similarly calibrated on only one of its surfaces. All surfaces so calibrated are marked with a mid line 23 representing the plane of the dial. The transverse member 20 is perforated by a slit aperture 24 out along the mid line 23. The Central member 19 is extended to form a pointer arm 25 bearing a dial plane line 26 throughout its length, the dial plane line 26 being in effect an extension of the dial plane 23. The dial plane line 26 passed through the pivot point 3. At the extremity of the pointer arm 25 is a Vernier Scale 27.

The three gnomons of the cross are the eastern gnomon 28, the western gnomon 29 and the Head gnomon 30. The numerals on the various surfaces indicate the manner of marking the hour scales. A ray of Sunlight in broken line is shown casting a shadow from the head gnomon 30 onto the hour scale on the transverse member 20 and indicating that the apparent time is 9.30 a.m.

Figure 5:
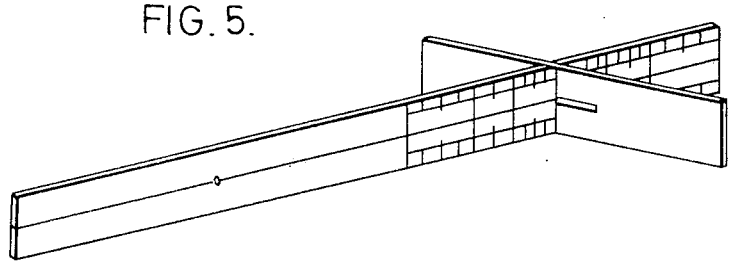
FIG. 5 shows the cross dial in perspective asembled.
Figure 6:
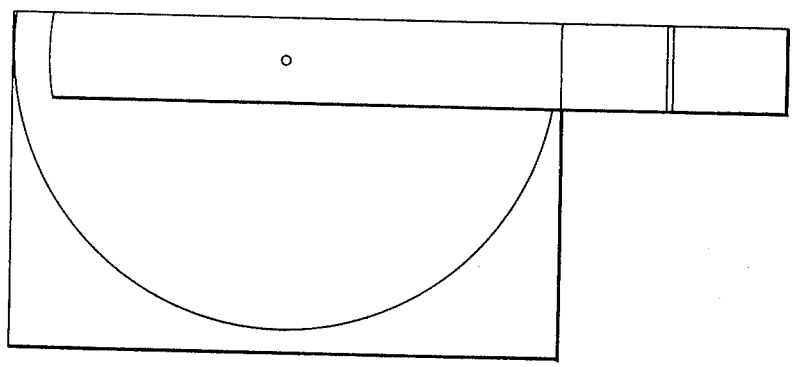
FIG. 6 shows the complete assembly in outline elevation.
Figure 7:
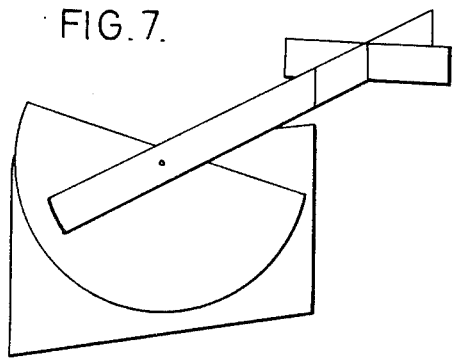
FIG. 7 shows the complete assembly in perspective as it might appear when ready for use.

The device of the invention is shown fully assembled in FIGS. 6 and 7 and the cross dial in FIG. 5.

The invention will now be illustrated by a number of examples of ways in which the device can be used.

There are two attitudes in which the device can be used: (a) edgewise and (b) flat.

By 'edgewise' I generally mean (unless otherwise stated) that the instrument is held with the plane of the base vertical, with the appropriate edge of the card directed towards the South (or North depending upon the hemisphere) point of the rational horizon, and with the meridian line horizontal, i.e. the meridian line is made to correspond with the geographical meridian of the geographical location and is in occulation with the rational (or real) horizon.

By 'flat' I mean that the instrument is held, or laid down, with the plane of the base horizontal; in which attitude, with the transverse member of the cross removed, the instrument may be employed in the manner of a 'Pelorus'.

When used in the edgewise attitude there are two distinct groups of operations possible: those which deal, in one way or another, with the altitude of the sun; and those which deal with the azimuth of the sun, that is some operations are concerned with how high the sun is above the horizon, while others are concerned with how far the sun swings across the sky between rising and setting. The former are concerned mainly with latitude finding, the latter with longitude finding.

EXAMPLE 1

To find the Altitude of the Sun at any time.

Set the Equator line to correspond with the meridian line.

Direct the instrument edgewise towards the sun.

Ensure that the meridian line is horizontal.

Elevate the dial until a beam of light, passing through the aperture of the transverse member of the cross runs true along the dial plane line.

The pointer will now be found to speak the altitude on the scale of the protractor.

EXAMPLE 2

To find the Sun's Declination by observation if Latitude is known.

The declination can in practice, be discovered from the reference diagram, but this is a useful exercise in understanding the interrelationship of Altitude/Declination/Latitude.

At the moment of local noon (i.e. when the sun bears true North or South), proceed as above to find the altitude.

Then, without disturbing the pointer arm, swing the protractor until the Latitude of the place comes under the pointer.

The Equator Line will now be found against the correct declination for that day on the Declination scale.

EXAMPLE 3

To find the Latitude

At Noon, when the sun is on the meridian, is the only time when this can be easily done.

First extract the declination for the day from the reference diagram.

Set the equator line to correspond with the appropriate mark on the declination scale.

Direct the instrument horizontally and edgewise along the North/South meridian of the place.

Elevate the dial until the beam of light coming through the aperture runs true along the dial plane line.

The pointer will now be found to speak the Latitude of that place on the Latitude scale.

EXAMPLE 4

To perform an Intercept by a modified Marc St. Hilaire method.

Though it is much simpler to find the latitude as described above this is a useful exercise to familiarise the student with this method.

Set the equator line to correspond with the declination for the day (found from the diagram).

Set the pointer arm to the assumed or dead-reckoned Latitude in which the observer believes himself to be.

At the moment when the sun transits through the meridian of that place direct the instrument edgewise towards the sun.

Now, if the assumed latitude is correct, a beam of light will be found running true along the dial plane line. But if the assumed latitude is not correct then the beam of light will be cut of true with the dial plane line. Accordingly as the beam is above or below the dial plane line the observer will know that his assumed latitude is too far away from, or too near towards the Sub-Solar point on the Earth's surface. By however many minutes of arc the observer finds he must raise or lower the dial plane in order to bring the beam of light into correspondence with the dial plane line the observer has a direct measure of the number of nautical miles by which he should shift his dead reckoned latitude away from or towards the sub-solar point.

EXAMPLE 5

To find the Month and day if unknown.

Find the declination of the sun by observation as above. Consult the diagram and find the two dates which the declination curve cuts the quantity scale at that value. Which of the two dates is the correct one is a matter for interpretation but if any doubt remains the same operation can be performed on the morrow. Accordingly as the declination is then found to have increased, or decreased, that will settle the question.

All of the foregoing operations are concerned with the sun's altitude in one way or another an in these operations the protractor may be regarded as a half-sectional model of the world. In the operations which follow the analogy does not hold because those are concerned with azimuth.

EXAMPLE 6

To find Local Time by the Apparent Sun.

The Equator line is zeroed on the declination scale.

The dial is elevated until the pointer corresponds with the Latitude of the place.

The instrument is directed edgewise along the North-/South meridian with the meridian line horizontal.

A shadow from one of the three free arms (or gnomons) of the cross will be seen to fall upon one or other of the scaled surfaces of the arms. The scale where this shadow falls directly speaks the local time by apparent sun.

EXAMPLE 7

To find Local Time by the Mean Sun.

Having found Local time by apparent sun as above refer to the curve of the equation of time. This shows by how many minutes of time the apparent sun is running fast or slow on mean sun on the day of observation. The number of minutes so found must be added to, or subtracted from the time by apparent sun; and the result is Local Time by Mean Sun.

EXAMPLE 8

To find Greenwich Mean Time or any other standard zone time if Longitude known.

Local Mean Time (as found above) differs from G.M.T. by a time interval proportional to the difference between the longitudes of the two places. The known Longitude of the observer's position is therefore converted from degree notation into Time notation (using the conversion scale if required). Accordingly as the observer is to the East, or West, of Greenwich meridian, this interval of time is either added to, or subtracted from Local Mean Time and the product is G.M.T.

EXAMPLE 9

To find the Longitude if G.M.T. is known.

G.M.T (by chronometer/radio/telephone) is noted at the moment of taking a sight and is confronted with L.M.T. as found above. The lesser is deducted from the greater of these two mean times and their difference is the observer's "Longitude in Time". This difference is converted into arc notation (employing the conversion scale) to reveal the Geographical Longitude of the place. If G.M.T. is the greater this signifies the observer is situated to the West of the prime meridian; but if G.M.T. is less than L.M.T. he is to the East.

EXAMPLE 10

To fix a Geographical Position.

A noon latitude sight is taken as above and plotted as a position line on a map or chart. During the forenoon or afternoon a longitude sight is made and likewise plotted on the chart as a position line. Where the two position lines intersect is the geographical position of the observer.

It may also be said that if, when taking a Noon Latitude sight, a note is also made of G.M.T. at that moment, this also provides a fix.

If movement has taken place between the times of the two plots (e.g. the observer is in a moving vessel or vehicle) the earlier of the two plots can be worked up to the second by standard navigational method.

In addition to the operations described above all of which involve observation of the sun, the instrument of this invention may be used to perform further operations of pilotage when land marks are in sight, but coastal navigational methods being already well documented in navigational literature it is superfluous to do more here than name some of the operations.

These operations are performed with the instrument laid, or held, flat. The transverse member of the cross dial has been made detachable to permit the assembly to be laid down upon any level surface.

The card being laid down with its meridian line parallel with the lubber line of the vessel, or vehicle, or directed toward the land mark chosen as datum, the instrument now functions as a Pelorus for measuring horizontal angles, thus facilitating any of the following common operations of pilotage: Setting up a safety angle, doubling the angle on the bow or stern, running fixes where only one land mark is in sight, anticipating a collision course, and calculating distance away.

I claim:

1. A navigational instrument comprising: a first flat member having thereon a meridian datum, an equinoctial datum crossing the meridian datum at right angles and a sun's declination scale; a second flat member co-planar with the first member, which second member has thereon an axis datum, an equator datum crossing the axis datum at right angles, and an arcuate latitude scale graduated in degrees from zero, the equator datum passing through the zero and the axis datum passing through the 90° on either side of the zero, the datum crossing point on the second member being rotatable about the datum crossing point on the first member; and a third member rotatable about the two crossing points which has at one end a pointer which can sweep along the latitude scale and at the other end an equatorial dial.

2. An instrument according to claim 1 in which the sun's declination scale is in the form of a declination arc having a centre which coincides with the crossing points, the arc being graduated in degrees on either side of the equinoctial datum.

3. An instrument according to claim 2 in which the declination arc is graduated in degrees, zero lying on the equinoctial datum, the arc extending on each side of the equinoctial datum by at least 23½° to indicate north and south declinations respectively of the sun.

4. An instrument according to claim 2 in which the second member is a protractor whose semicircular edge is graduated in degrees and lies adjacent the declination arc.

5. An instrument according to claim 4 in which the axis datum is a line along the diameter of the protractor and the equator datum is a line dividing the protractor into two quadrants representing north and south latitudes, zero degrees lying on the equator line and 90° extending on either side to the axis line.

6. An instrument according to claim 4 in which the third member is a pointer arm, for indicating degrees on the protractor, the pointer arm having a dial plane line and being rotatable about the crossing points such that the dial plane line extends through the crossing points.

7. An instrument according to claim 6 in which the equatorial dial is cruciform in shape, the arms of the dial being graduated in time scales, a first pair of said arms being in a plane in alignment with the dial plane line of the pointer arm and a second pair of said arms being in a plane normal to the first pair of arms, one of said second pair of arms having an aperture.

* * * * *